United States Patent [19]
Nakamura et al.

[11] Patent Number: 5,592,249
[45] Date of Patent: Jan. 7, 1997

[54] DATA IMPRINTING DEVICE FOR A CAMERA

[75] Inventors: Toshiyuki Nakamura; Isao Soshi; Hidenori Miyamoto; Hiroshi Wakabayashi, all of Tokyo, Japan

[73] Assignee: Nikon Corporation, Tokyo, Japan

[21] Appl. No.: 423,319

[22] Filed: Apr. 18, 1995

Related U.S. Application Data

[62] Division of Ser. No. 119,712, Sep. 10, 1993, Pat. No. 5,519,463.

[30] Foreign Application Priority Data

Sep. 10, 1992 [JP] Japan ................................. 4-241895

[51] Int. Cl.⁶ ............................................ G03B 17/24
[52] U.S. Cl. ............................................ 396/315
[58] Field of Search ................................. 354/106

[56] References Cited

U.S. PATENT DOCUMENTS 5,245,373  9/1993  Ogawa et al. ................ 354/106

FOREIGN PATENT DOCUMENTS 2622707  5/1989  France .
3435309  4/1985  Germany .
4-81831  4/1992  Japan .

*Primary Examiner*—Michael L. Gellner
*Assistant Examiner*—J. K. Han
*Attorney, Agent, or Firm*—Thomas R. Morrison; Christopher R. Pastel

[57] ABSTRACT

A data imprinting device focusses light emitted from an array of LEDs onto the film, exposing the film as it is fed. A single chip microcomputer controls the LED array to imprint data. Some of the LEDs in the array are always energized together, while others are energized independently. The LEDs which are energized together require only a single control line, thus reducing the number of control lines, and consequently permitting reduction in the size of the camera. The group-wise serial activation of the dot matrix columns slightly staggers the imprinted data, but the imprinted characters are fully recognizable. In addition to reducing the number of control lines, the group-wise serial activation also reduces the peak load on the constant circuit, and thereby reduces the size of this circuit.

1 Claim, 9 Drawing Sheets

DATA IMPRINTING DEVICE FOR A CAMERA

This is a divisional of application Ser. No. 08/119,712 filed on Sep. 10, 1993, now U.S. Pat. No. 5,519,463.

BACKGROUND OF THE INVENTION

The invention relates to data imprinting devices for cameras which imprint data, such as a date, on photosensitive film. More specifically, the invention relates to a data imprinting device which imprints by exposing a dot-matrix of points on a photographic film using an array of light emitting elements activated synchronously with the feeding of the film.

Referring to FIG. 8, a data imprinting device 80, according to the prior art, employs seven light emitting diodes (LEDs) 1–7 arranged perpendicularly to a direction of feed of a film. A constant voltage circuit 73 feeds power from a battery 71 to a motor drive circuit 37. Constant voltage circuit 73 provides a constant voltage output despite fluctuations in the voltage of battery 71. Constant voltage circuit 73 supplies stabilized power to a CPU 17, a light emitting diode (LED) drive circuit 19 and a photo interrupter 53.

A partial pushdown switch SW1 and a full pushdown switch SW2 are connected to CPU 17. Partial pushdown switch SW1 is actuated by partial depression of a camera release button. Full pushdown switch SW2 is actuated by full depression of the camera release button. Output signals from photo interrupter 53 are input to CPU 17. Outputs from CPU 17 are connected to LED drive circuit 19 and motor drive circuit 37. A feed motor 38, for feeding film, is driven by motor drive circuit 37.

Seven LEDs 1–7 are connected to LED drive circuit 19. Seven output terminals A1–A7 of CPU 17 provide control signals on signal L1–L7 to corresponding input terminals B1–B7 of LED drive circuit 19.

The control signals on signal lines L1–L7 control counterpart LEDs 1–7, respectively. Thus, control signals from signal line L1, for example, control signals input on signal line L2 cause LED 2 to emit light, and so forth.

Referring now to FIGS. 1, 8 and 9, numerals are formed by the data imprinting synchronized with the feeding of film. Numerals are formed by activating a combination of LED1–LED 7 (FIG. 9), at successive intervals of time for each numeral. The time intervals are keyed to the movement of the film as the film is fed. Dot matrix patterns are thereby generated, each time interval mapping into a corresponding interval of the film. Data imprinting exposure takes place in five successive time intervals A, B, C, D and E.

The blackened circles represent exposed regions on the film for formation of the numeric character "9". The white circles represent regions on the film which remain unexposed in forming the character "9" during feeding of the corresponding interval of film.

In the conventional data imprinting device, each LED is connected to its own signal line. Thus, to control operation of, seven LEDs 1–7, for example, seven signal lines L1–L7 are required.

In addition, note that each column A through E represents an interval of film that was fed past and exposed by LEDs 1–7 at the same time. Therefore, up to 7 LEDs may be activated at a single time in order for the character shown in FIG. 9 to be imprinted. Thus, the conventional imprinting device must power all seven LEDs simultaneously. For example, when imprinting the points in column C for the numeral "1," seven LEDs are simultaneously lighted. If 20 mA of current is required to light each LED, the conventional device requires a constant-voltage circuit having a capacity as large as 140 mA.

In view of the recent trend toward reducing the size of cameras, the space required by components, such as signal lines and circuit elements, is a significant design issue. Thus, the ability to reduce the size, number and cost of components has positive implications for camera design.

A data imprinting device requiring fewer control signal lines would not only reduce the number of components by the number of signal lines, but also the size of the CPU. This is because the CPU requires fewer control signal outputs to drive a given number of LEDs. Thus, a camera employing a CPU with seven control signal outputs is inevitably larger and more costly than one employing a CPU with fewer control signal outputs.

The ability to reduce the peak power requirements of the LED array over that of a conventional device can also result in space and cost savings.

Another embodiment of a data imprinting device, disclosed in Japanese Laid-open Patent Publication No. 4-81831, achieves a lower peak power requirement by activating the LEDs sequentially, so that fewer LEDs are activated at a given time. But, in this device, the characters imprinted are slanted and difficult to read. In addition, successive LEDs in this device are activated before previous ones are deactivated. The device, therefore fails to take full advantage of the possible peak power reductions.

OBJECTS AND SUMMARY OF THE INVENTION

It is an object of the present invention to reduce the size and number of components required for a camera data imprinting device of prior art design.

It is a further object of the present invention to provide a camera data imprinting device with fewer control signal output terminals and signal lines compared to conventional devices.

It is a further object of the present invention to provide a camera data imprinting device that require a lower capacity constant-voltage circuit than conventional designs.

It is a still further object of the invention to provide a camera data imprinting device capable of imprinting clear, recognizable characters.

Briefly stated, the present invention is a device for a camera that imprints data such as a date, on photosensitive film. Light emitted by an array of LEDs is focused onto the film, exposing the film as it is fed. A single chip microcomputer controls the LED array to imprint data. Several lines connect the microcomputer to a LED driver circuit. Each input of the driver circuit corresponds to a single LED in the LED array. However, some outputs of the microcomputer chip are connected to more than one input of the driver. Thus, the number of control lines required is less than the total number of LEDs used to form the imprinted data.

The microcomputer activates the appropriate LEDs in groups, each group being activated consecutively. Thus, the maximum number of LEDs activated at a given instant is equal to the maximum number of LEDs in the group with the most LEDs.

The resulting imprinted characters therefore include points, lying in separate rows, that are always imprinted, in concert. Also, because of the group-wise serial activation, the dot matrix columns of imprinted data are somewhat staggered. Yet, the characters imprinted are very recognizable. The grouping of LEDs produces characters that are more recognizable than those produced by prior art devices that employ temporal staggering to reduce peak power demand.

Because of the configuration and control of the data imprinting device, the number of CPU output terminals, signal leads and the peak demand of the LED are reduced. Additionally, the size of the microcomputer can be reduced relative to that of a conventional device because of the reduced number of output terminals required. Moreover, the size of the constant voltage circuit may be reduced relative to that of a conventional device because of the reduced peak demand.

According to an embodiment of the present invention there is disclosed a data imprinting device for a camera comprising: a plurality of light emitting elements, a control circuit, the control circuit including means for producing a plurality of control signals, first means, responsive to one of the plurality of control signals, for controlling at least two of the plurality of light emitting elements and second means, responsive to at least another of the plurality of control signals for controlling at least another of the plurality of light emitting elements, independently of the at least two whereby reduced control leads are provided.

According to another embodiment of the present invention there is disclosed, a data imprinting device for a camera comprising: a plurality of light emitting elements, a control circuit, the control circuit including means for producing a plurality of control signals, first means, responsive to ones of the controls signals for controlling ones of the plurality of light emitting elements, second means, responsive to at least another of the plurality of control signals for controlling, for controlling at least another of the plurality of light emitting elements, independently of the ones and the control circuit including means for producing a timing of controlling of the ones at a time non-overlapping with the controlling of the at least another, whereby reduced peak power demands are provided.

According to still another embodiment of the present invention there is disclosed a data imprinting device for a camera comprising: a plurality of light emitting elements, a control circuit, the control circuit including means for producing a plurality of control signals, first means, responsive to one of the plurality of control signals, for controlling at least two of the plurality of light emitting elements, second means, responsive to at least another of the plurality of control signals for controlling at least another of the plurality of light emitting elements, independently of the at least two, the control circuit including means for producing a timing of controlling of the at least two at a time non-overlapping with controlling of the at least another, whereby reduced control leads, and reduced peak power demands are provided.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
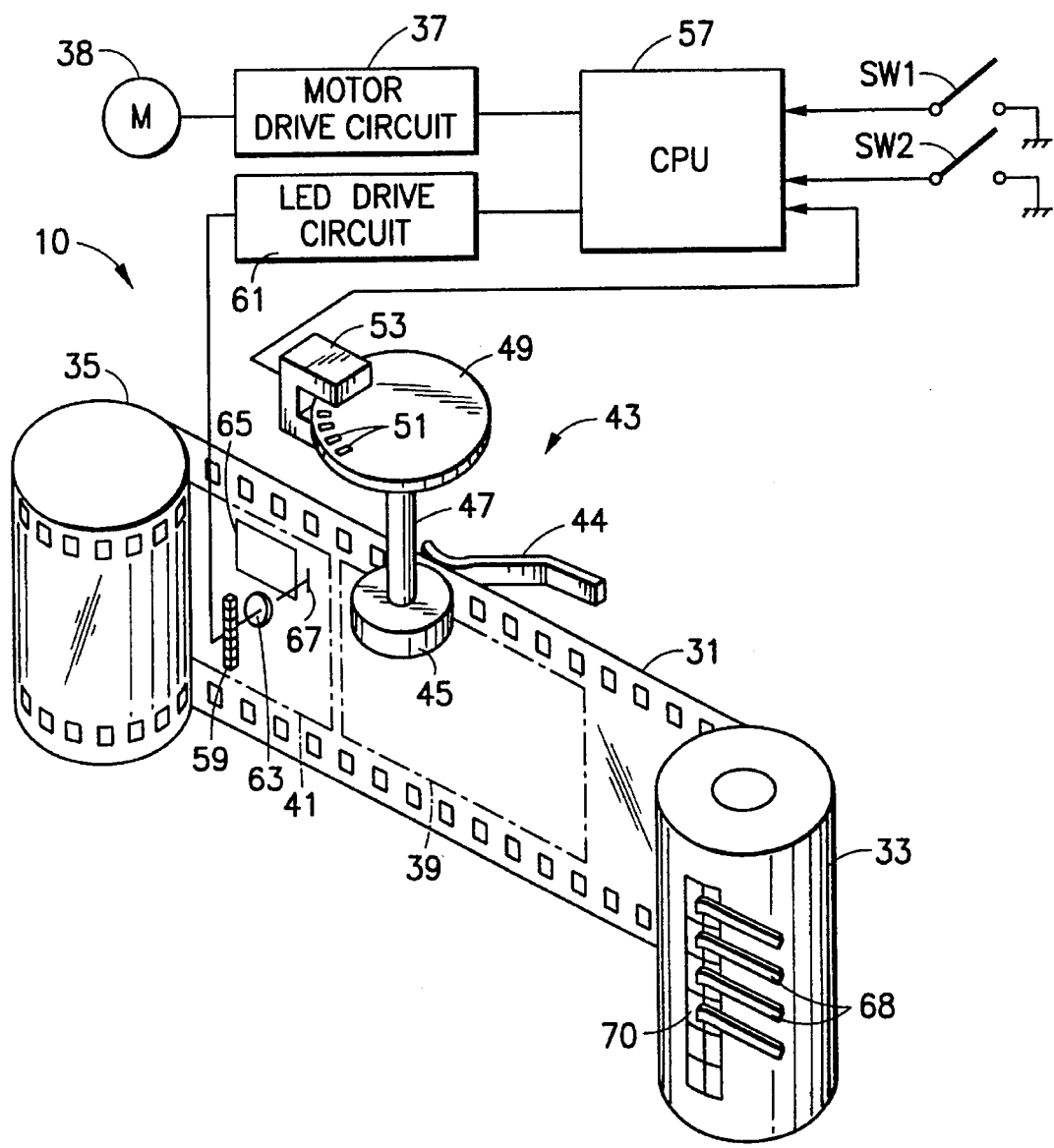
FIG. 1 is a perspective view of a data imprinting device according an embodiment of the present invention.

Referring to FIG. 1., a data imprinting device 10 for a camera is shown. A photosensitive film 31 contained in a film cartridge 33, is wound around a spool 35. Feed motor 38 is actuated by motor drive circuit 37 to drive spool 35.

An aperture frame 39, represented by double-dashed broken lines, is a region of the film located directly behind an aperture of the camera. Thus, aperture frame 39 is the region of film 31 which is exposed when a photograph is taken. An exposed frame 41, also represented by double-dashed lines, is a previously exposed region of film 31.

A film feed detector 43, for detecting the feeding of film 31 as it is wound, is located above aperture frame 39. Film feed detector 43 includes a film feed detection roller 45 biased by a pressure leaf spring 44 into contact with film 31. A disk-shaped encoder 49 is connected, through a shaft 47, to film feed detection roller 45. As film 31 advances, film feed detection roller 45 is correspondingly rotated. Encoder 49 is rotated the same amount as film feed detection roller 45.

Encoder 49 contains a number of radial slits 51. Encoder 49 is partly inserted in photo interrupter 53. As encoder 49 rotates a light beam generated by photo interrupter 53 is alternately transmitted and blocked as each radial slit 51 passes beneath it. When the light beam is transmitted, it strikes a photodetector in photo interrupter 53 so that photo interrupter 53 output alternates between a high and a low level as encoder 49 rotates. Thus, photo interrupter 53 sends a train of rectangular waves, called the film sensor signal (FSS), to a CPU 57 in response to rotation of encoder 49. The amount of film 31 that is fed is detected by counting the number of signal level reversals of the FSS. According to the present embodiment, 360 FSS reversals are generated during the feeding of a single frame of film.

Signals from partial pushdown switch SW1 and full pushdown switch SW2 are fed to CPU 57. A LED array 59, consisting of seven LEDs arranged in a straight line at specified intervals, is positioned in front of film 31. A LED drive circuit 61, which is connected to CPU 57, controls the emission of light by each LED in LED array 59.

A focusing lens 63 directs light emitted by LED array 59 to a narrow focal region 67 of exposed frame 41. Light, emitted from LED array 59, exposes film 31 in focal region 67 as film 31 is fed. LED array 59 is activated according to a time-varying sequence under the control of CPU 57. The activation of LED array 59 is synchronized with the feeding of film 31 to occur within a specified range of feed of film 31. Thus, dot matrix patterns of imprinted data 65 are formed.

Electrical contacts 68 read a conventional DX code 70, which indicates the number of exposed-photograph frames and the ISO sensitivity of film 31, from film cartridge 33.

Figure 2:
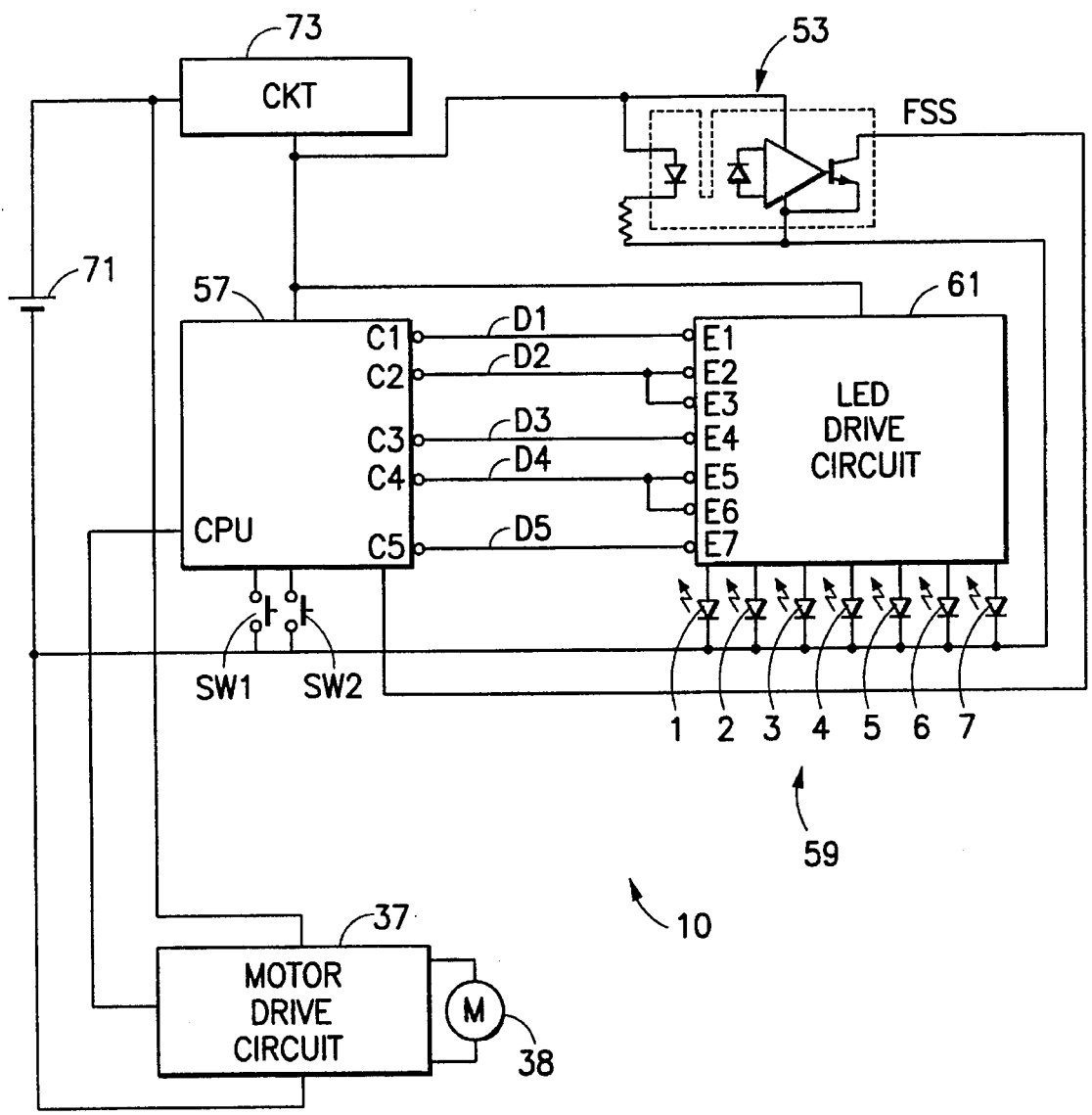
FIG. 2 is a circuit diagram of the data imprinting device of FIG. 1.

Referring now also to FIG. 2, data imprinting device 10 includes motor drive circuit 37 and constant voltage circuit 73 connected to battery 71. Constant voltage circuit 73 stabilizes the supply of power by insuring a constant voltage output despite fluctuations in the voltage of battery 71. Constant voltage circuit 73 supplies stabilized power to CPU 57, an LED drive circuit 61 and photo interrupter 53.

CPU 57 is preferably a single chip microcomputer that controls the sequence of operation of the camera. CPU 57 incorporates a FSS counter and a timer, whose operations are described below. Partial pushdown switch SW1 and full pushdown switch SW2 are connected to CPU 57. Partial pushdown switch SW1 and full pushdown switch SW2 are actuated by partial and full depression of a camera release button respectively. CPU 57 is also connected to LED drive circuit 61 and motor drive circuit 37. Feed motor 38 is connected to motor drive circuit 37.

Seven LEDs 1~7 comprising LED array 59 are connected to LED drive circuit 61. FSS output of photo interrupter 53 is connected to an input of CPU 57.

CPU 57 has five control signal output terminals C1~C5 for applying control signals on signal lines D1~D5 to LED drive circuit 61. The five control signals are connected to seven control signal input terminals E1~E7 on LED drive circuit 61, corresponding respectively to the seven LEDs 1~7.

The connection of five signal lines D1~D5 to the seven control signal input terminal E1~E7 of LED drive circuit 61 is as follows. Signal line D1 connects control signal output terminal C1 to control signal input terminal E1. Signal line D2 from control signal output terminal C2 is connected in parallel to control signal input terminals E2 and E3. Signal line D3 from control signal output terminal C3 is connected to control signal input terminal E4. Signal line D4 from control signal output terminal C4 is connected in parallel to control signal input terminals E5 and E6. Signal line D5 from control signal output terminal C5 is connected to control signal input terminal E7.

Thus, control signals from one of signal lines D1, D4 and D7 causes an emission of light from corresponding LED 1, 4 or 7. A control signal from signal lines D2 or D4 causes the emission of light from the corresponding pair of LEDs, 1 and 2 or 5 and 6.

Figure 3:
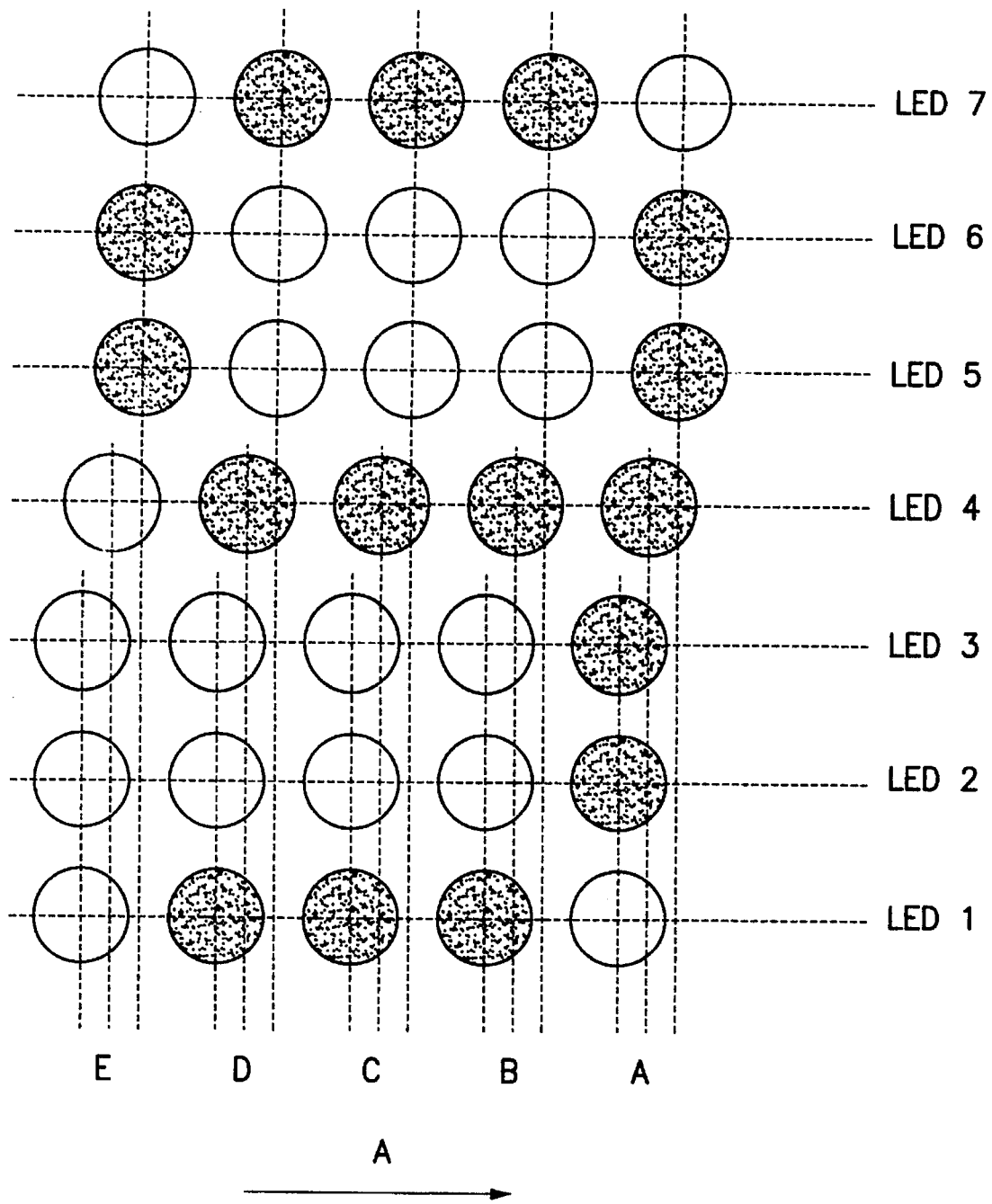
FIG. 3 is a schematic diagram showing a character imprinted by the data imprinting device of FIG. 1.
Figure 9:
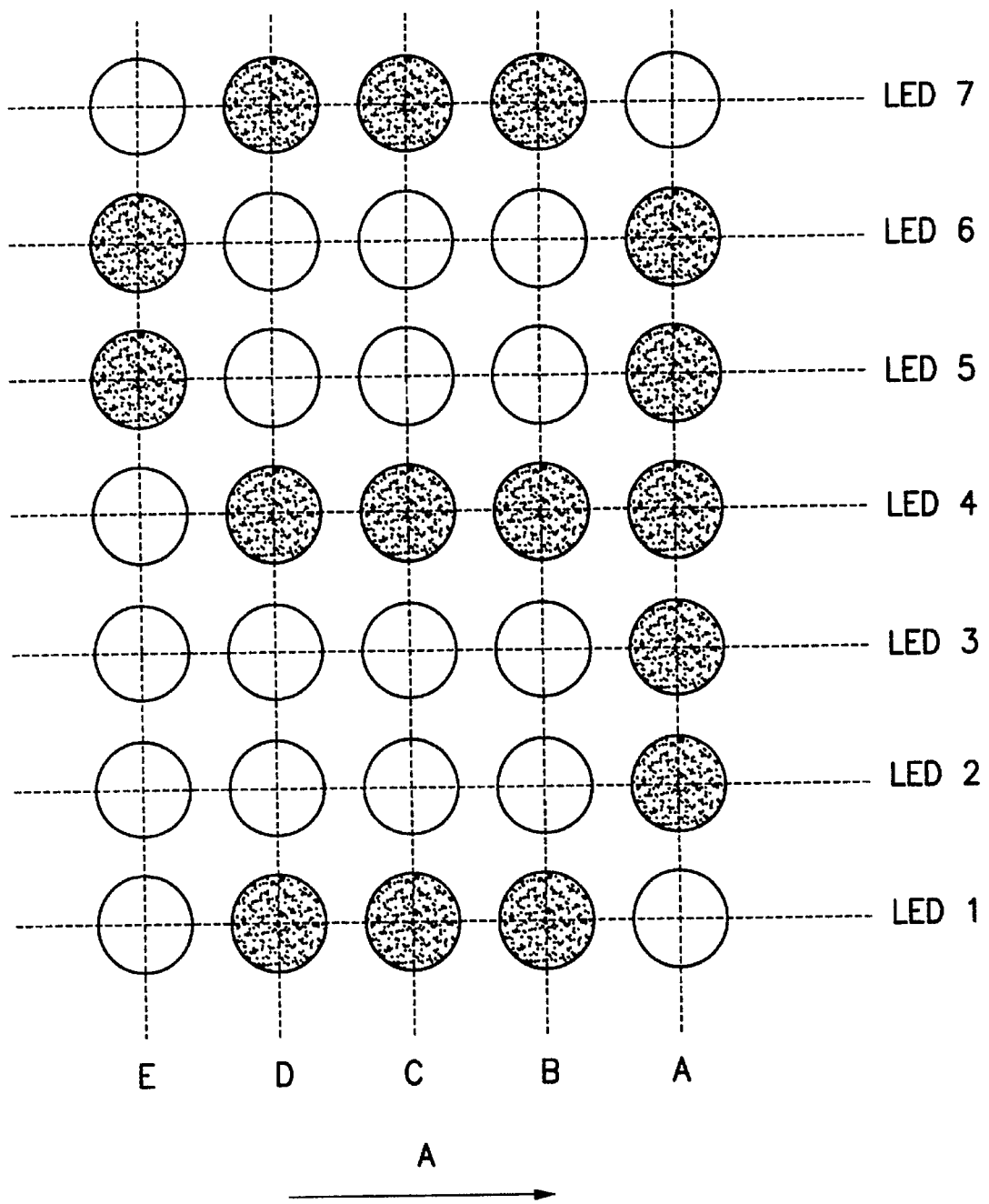
FIG. 9 is a schematic diagram showing a character imprinted by the data imprinting device of FIG. 8.

Referring now to FIGS. 1, 2 and 3, a numeral formed by the dot matrix patterns generated by data imprinting device 10 are shown in FIG. 3. The blackened circles represent exposed areas on film 31 constituting imprinted data 65 to form the numeric character "9". The white circles represent regions on film 31 that remain unexposed in forming the character "9". A slight, but acceptable difference is seen between the character "9" in FIG. 3, and the character "9" in the prior art character "9" of FIG. 9.

As shown in FIG. 3, the activation of LEDs LED1~LED7 occurs during five successive intervals in time, A, B, C, D and E, keyed to the movement of film 31, to form each numeral. Each of the five successive time intervals represents a range of times having three specific times during which various subsets of LEDs LED1~LED 7 may be energized. LEDs LED5/LED6 are always actuated together at the earliest of the three times in each interval. LEDs LED2/LED3 are always actuated together at the latest of the three times in each interval. The time of actuation of LED5/LED6 contains no overlap with the time of actuation of LED2/LED3. Independently controlled LED7 is actuated at the same times as LED5/LED6. Independently controlled LED1 is actuated at the same time as LED2/LED3. Independently controlled LED4 is actuated at a time intermediate between the earliest and the latest time in each range.

Although the circles representing LED illumination appear to overlap in FIG. 3, in fact, this overlap results from the imaging of light from very brief illumination of the LEDs., and not from the energization time of the LEDs. The energization of LEDs at the first, second and third times in each range do not overlap. Therefore, at the most, only three LEDs are energized at any time (LED5/LED6/LED7 or LED1/LED2/LED3). At the middle time in each interval, only LED4 is illuminated, if energized.

In the present embodiment LED5, LED6, and LED7 comprise. group 1. The feeding of an interval of film 31 triggers the activation of the LEDs in group 1. The LEDs in group 1 remain activated for a specified period after which they are deactivated. LED 4 comprises group 2 and is activated immediately after the LEDs of group 1 are deactivated. LED4 remains activated for a specified period after which it is deactivated. LED1, LED2 and LED3 comprise group 3 and are activated immediately after the LEDs of group 2 are deactivated. The group 3 LEDs remain activated for a specified period after which they are deactivated. Thus, only one group of LEDs, group 1, group 2 or group 3, is activated at a given instant of time.

Figure 4:
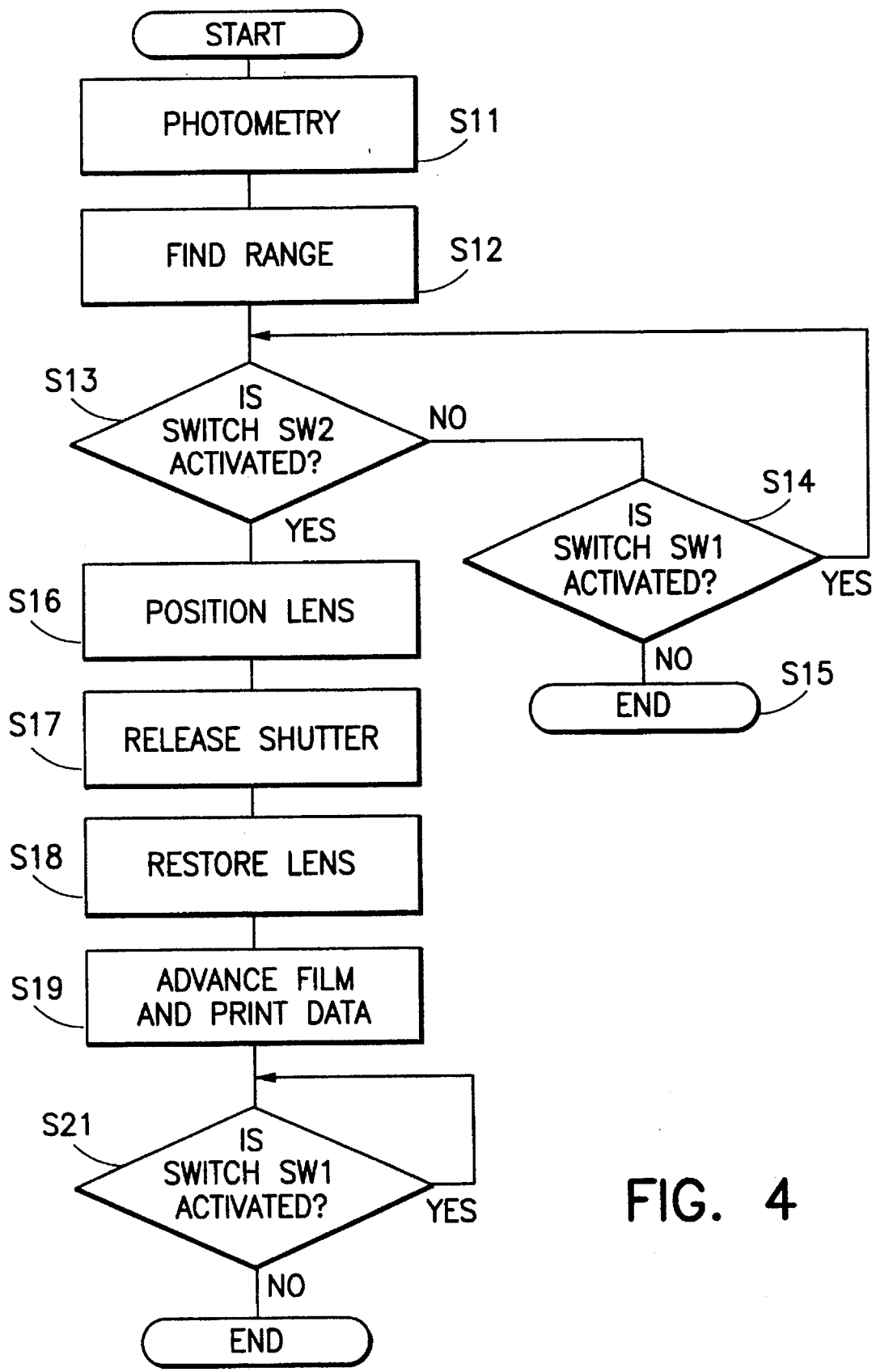
FIG. 4 is a flow chart showing the photographing operation performed by the data imprinting device of FIG. 1.

Referring now also to FIG. 4 the photographing operation begins when partial pushdown switch SW1 is activated. First, CPU 57 sends signals to a photometry circuit (not shown) in step S11, directing the photometry circuit to perform the photometry operation. Details of the photometry operation are not explained herein. Briefly stated, however, the luminance of an object to be photographed is calculated based on the quantity of light detected by light-sensing elements in the photometry circuit. The circuit determines the length of time the shutter should remain open based on a calculation of luminance.

Next, in step S12, a range finding initiation signal is sent to a range finding circuit, which is not shown. Then the range finding operation is performed.

Next, the position of full pushdown switch SW2 is detected in step S13. If full pushdown switch SW2 is off, the position of partial pushdown switch SW1 is detected in step S14. If partial pushdown switch SW1 is off, the photographing operation is terminated in step S15.

If full pushdown switch SW2 is on, the lens is positioned in step S16, according to the range determined in the range finding operation of step S12. In step S17 the shutter is released for the length of time calculated in step S11. Next, in step 18, the lens is restored to its initial position.

Next, film 31 is advanced, and data is simultaneously imprinted on film 31 in step S19. In step S21, the position of partial pushdown switch SW1 is determined. Step S21 is repeated until partial pushdown switch SW1 is turned off.

Step S19 consists of one cycle of the film take-up operation. This operation feeds film 31 a distance corresponding to one frame, wherein one frame equals 360 FSS level reversals. As film 31 feeds, the data imprinting operation is initiated at the 200th FSS edge and continues through the 280th FSS edge.

Figure 5:
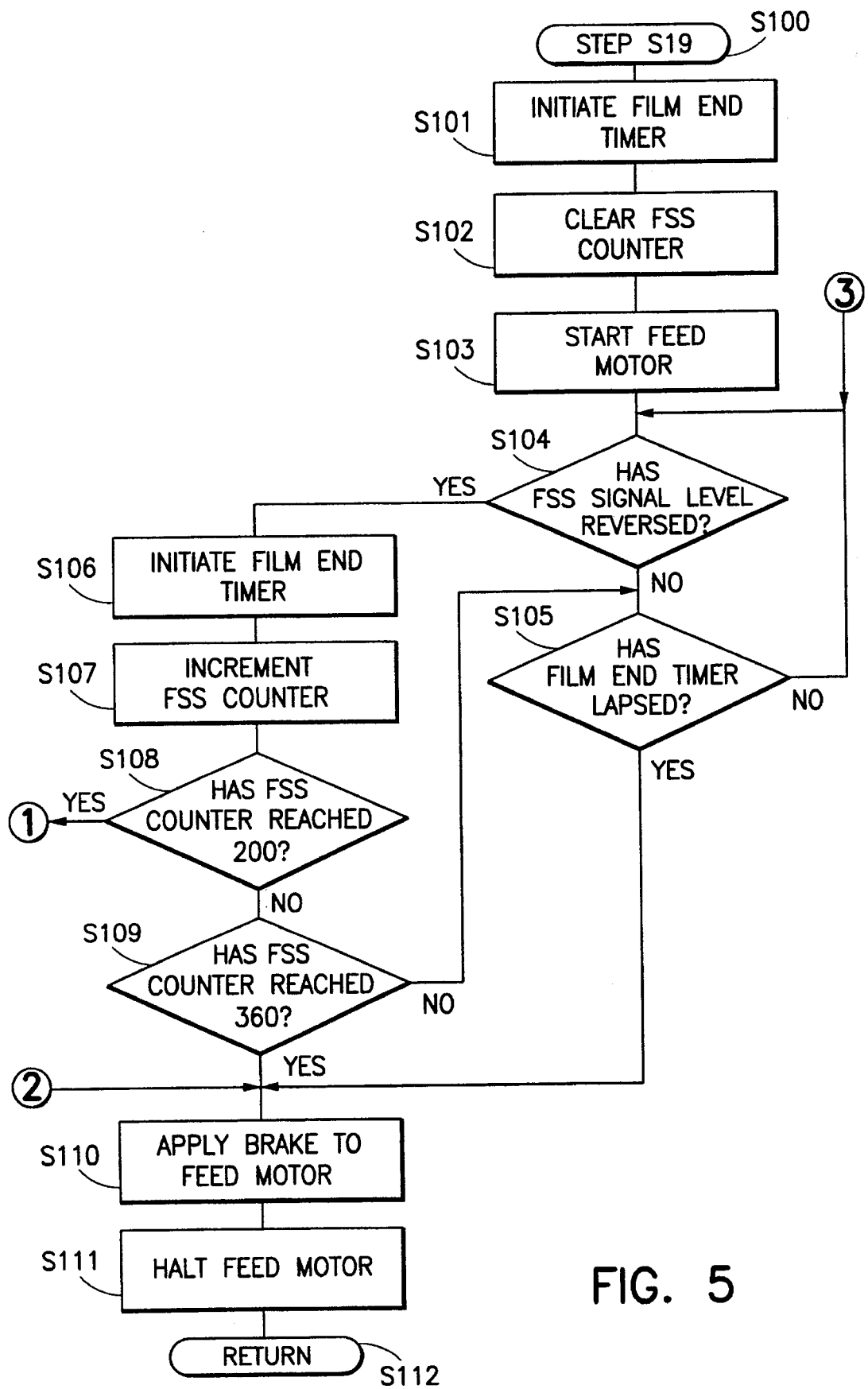
FIG. 5 is a flow chart showing a film take-up operation performed by the data imprinting device of FIG. 1.

Referring to FIG. 5, the details of the operation performed in step S19 of FIG. 4 are shown. At the start of the film take-up operation called for in step S19, a film end detection timer is initiated in step S101. The film end detection timer determines whether the end of the film has been reached. This timer counts down to zero when no FSS level reversal is detected for a specified period. The absence of FSS level reversals indicates that the film has stopped feeding, and therefore the end of film is inferred.

Next, a FSS counter is cleared in step S102. The FSS counter counts the FSS level reversals generated by photo interrupter 53, as film 31 is advanced a distance of 360 FSS reversals corresponding to one frame. Next, forward rotation of feed motor 38 is initiated in step S103. When feed motor 38 is activated, film 31 is advanced and taken up by spool 35 of the camera.

In step 104, operation proceeds to S105 if the FSS level has reversed, or to S105 if the FSS level has not yet reversed. In step S105, the lapse of the film end detection timer returns operation to step S104. Otherwise, operation proceeds to step S110. A brake is applied to feed motor 38 for 100 μs in step S110. Feed motor 38 is halted in step S111. Operation then exits the flow chart of FIG. 5 and returns to step S21 of FIG. 4.

Figure 6:
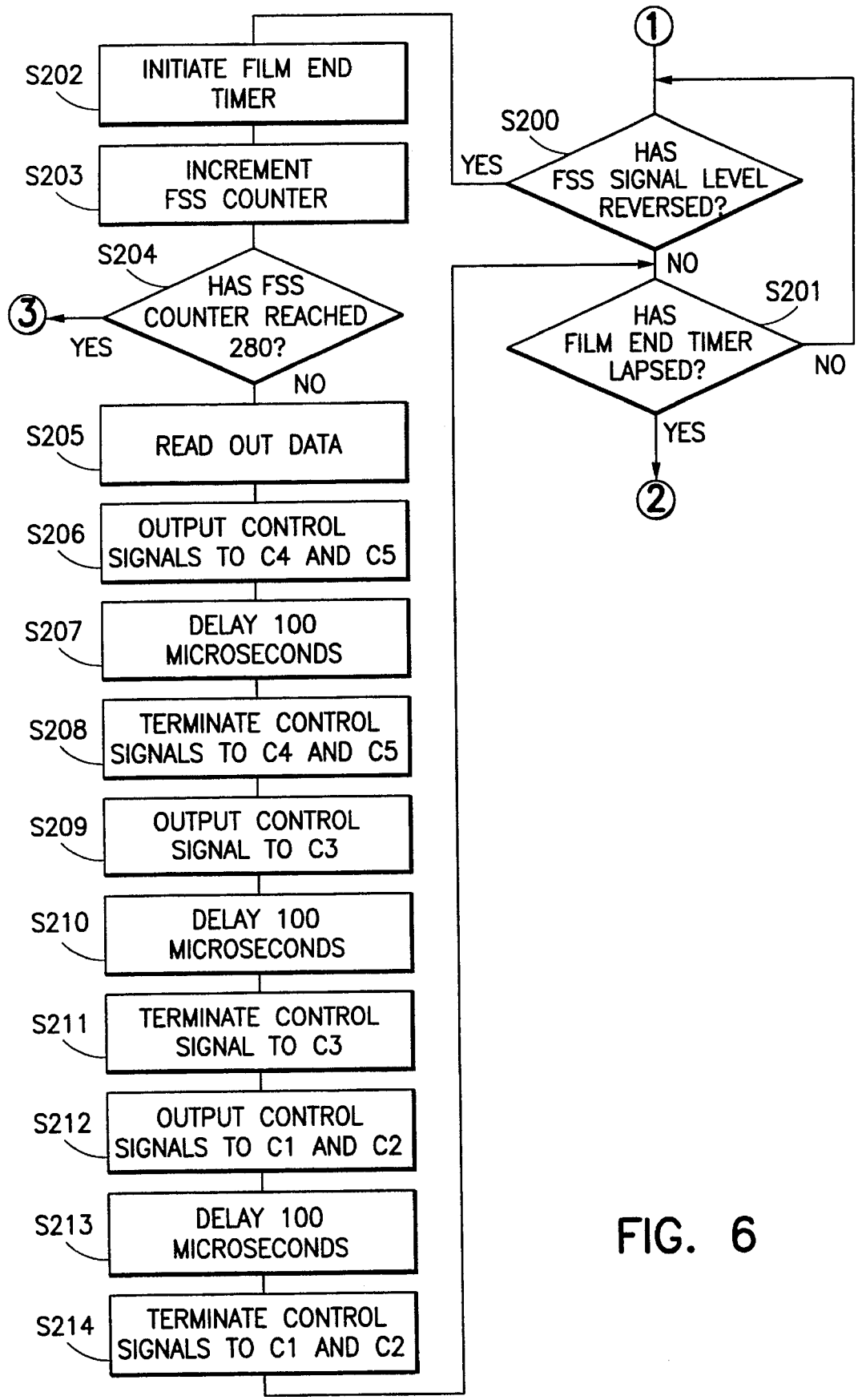
FIG. 6 is a flow chart showing a data imprinting operation performed by the data imprinting device of FIG. 1.

Referring now also to FIG. 6, if the FSS level has reversed in step S104, the film end detection timer is cleared, and restarted in step S106. In step S107, the FSS counter is incremented. Next, in step S108, the value in the FSS counter is compared to the value 200. When this comparison indicates that the value 200 is reached, operation proceeds to step S200, where the data imprinting operation is initiated. If the FSS counter does not reach 200, the value in the FSS counter is compared to the value 360 in step S109.

When the FSS counter reaches 360, advance of a single frame of film 31 is completed. If so, a brake is applied to feed motor 38 for 100 μs in step S110. Feed motor 38 is halted in step S111, and the operation exits the flow chart of FIG. 5 and returns to step S21 of FIG. 4.

If the FSS counter has not reached 360 upon execution of step S109, the operation proceeds to step S105, where lapse of the film end detection timer is determined. If the lapse is not detected, the operation returns to step S104. Thus, the operation loops through steps S104 and S105 until the film end detection timer has lapsed, or the FSS level reverses.

When operation branches from step S108 to step S200 upon determination of a FSS counter value of 200, the film end detection timer is cleared, and the timer restarted in step S202. Next, the FSS counter is incremented in step S203. The FSS counter is compared to the value 280 in step S204. If the FSS counter has reached 280, the data imprinting process is terminated, and operation branches to step S105 of FIG. 5 and back into the S104/S105 loop.

If the content of the FSS counter is less than 280 at step S204, the data imprinting process proceeds as follows. The data to be imprinted is read out into the imprinting region of CPU 57 in step S205. In Step S206, control signals for data imprinting are output through control signal output terminals C5 and C4 of CPU 57 according to the data read out in step 205. The appropriate LEDs among LED7, LED6 and LED5 of group 1 are thus activated. A delay of 100 μs occurs in step S207 during which the appropriate LEDs among LED7, LED6 and LED5 remain activated. After the 100 μs delay, the data imprinting signals are terminated in step S208, and LEDs LED7, LED6 and LED5 are deactivated.

Next, in step S209, control signals for data imprinting are output through control signal output terminal C3 of CPU 57 according to the data read out in step S205. LED 4 is thereby activated, if appropriate. A delay of 100 μs occurs in step S210 during which LED4 remains activated, if appropriate.

After the 100 μs delay, the data imprinting signal is terminated in step S211, and LED4 is deactivated.

In Step S212, control signals for data imprinting are output through control signal output terminals C2 and C1 of CPU 57 according to the data read out in step S205. The appropriate LEDs among LED3, LED2 and LED1 of group 3 are thus activated. A delay of 100 μs occurs in step S213 during which the appropriate LEDs among LED3, LED2 and LED1 remain activated. After the 100 μs delay, the data imprinting signals are terminated in step S214, and LEDs LED3, LED2 and LED1 are deactivated.

Referring now to FIGS. 1, 3, 5 and 6, the above operation corresponds to the imprinting of the first column of the dot matrix of the first character of the data, ie., column A of FIG. 3. This operation is completed within the time between two consecutive FSS level reversals.

Figure 7:
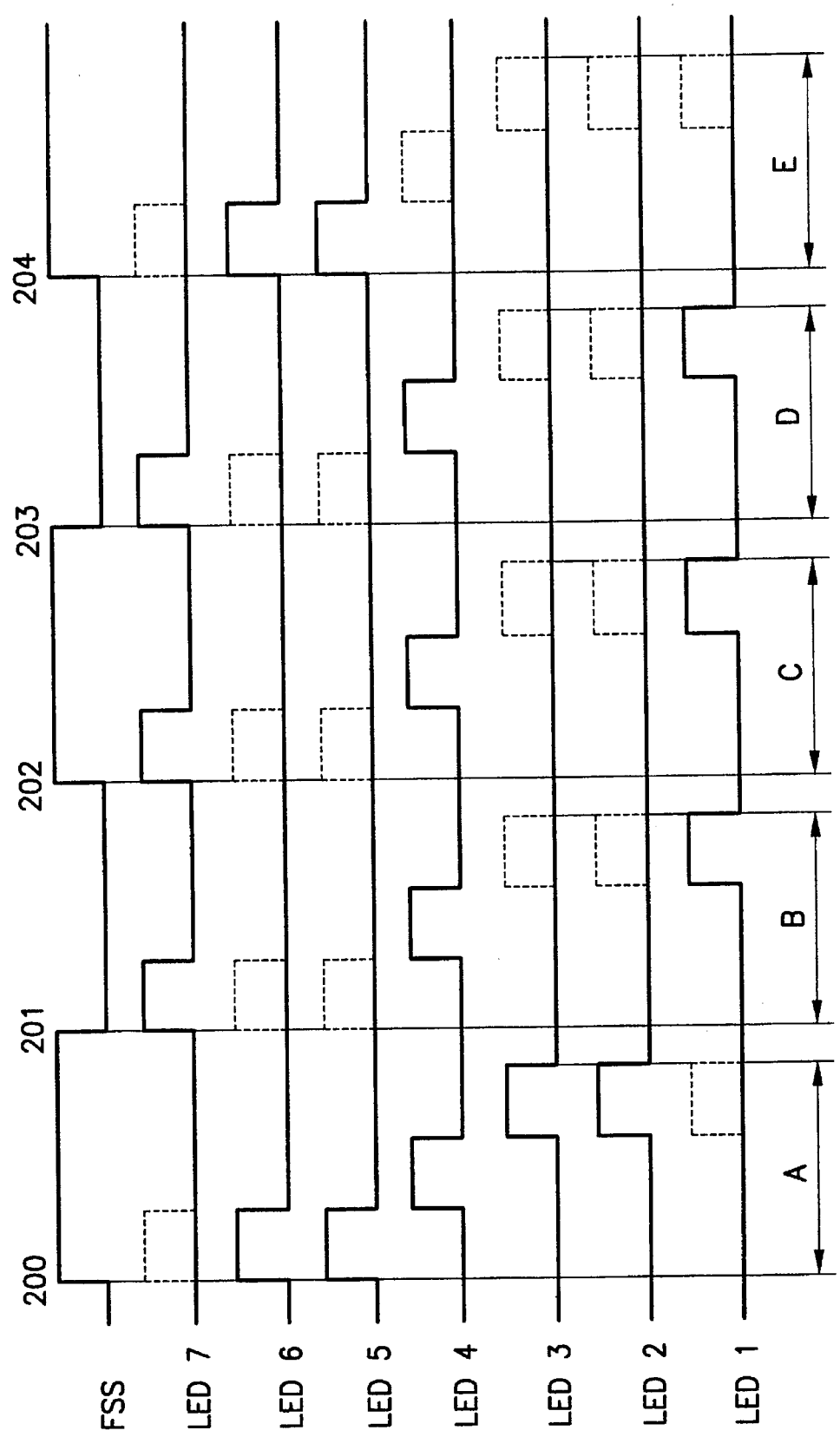
FIG. 7 is time chart showing the temporal relationship between the FSS and the control signals governing each LED of the data imprinting device of FIG. 1.
Figure 8:
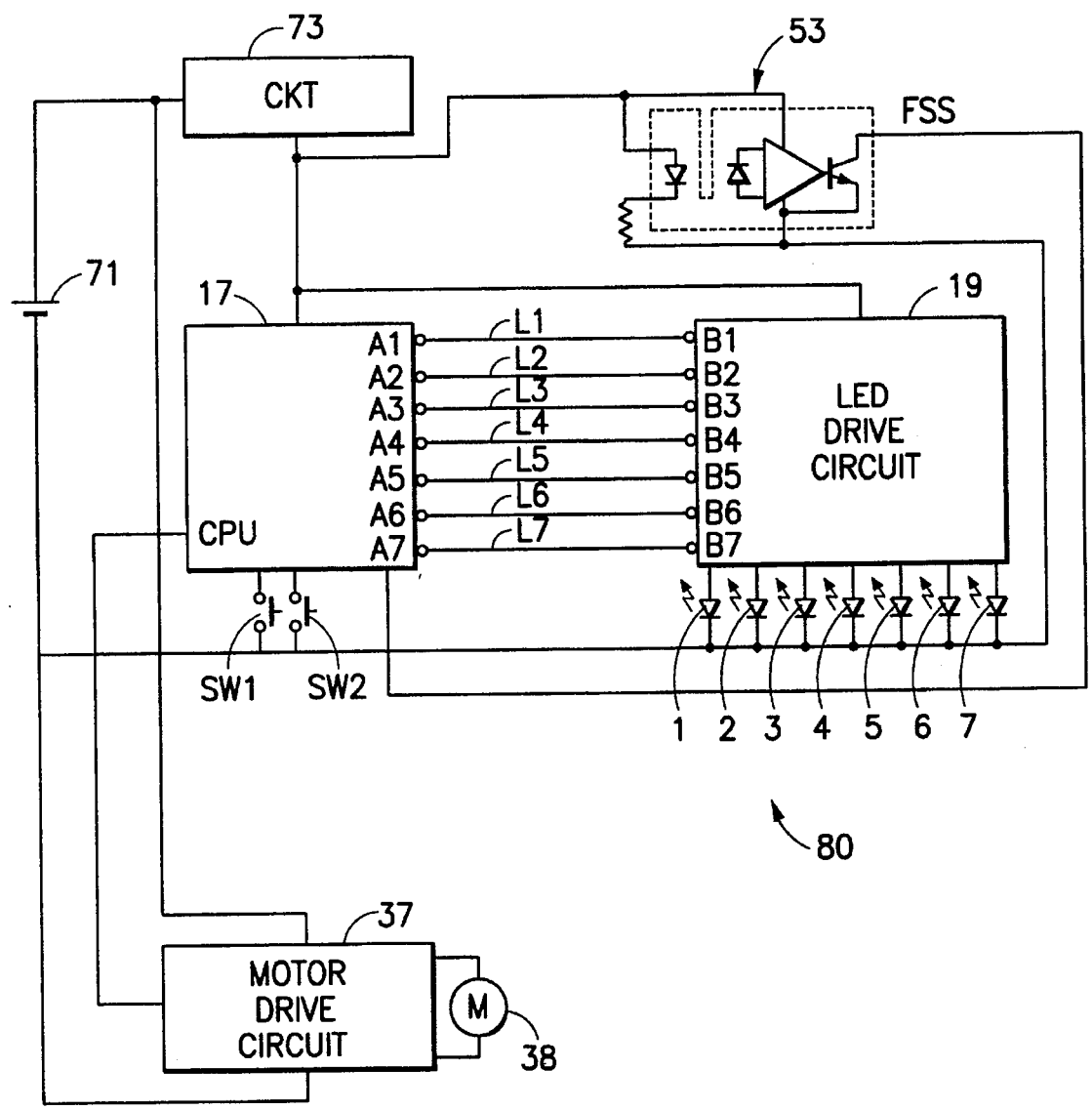
FIG. 8 is a circuit diagram of a conventional data imprinting device for a camera.

Referring to FIGS. 2, 3, and 7, FIG. 7 shows the temporal relationship between the FSS and the activation of LEDs LED1–LED7 to imprint the numeral "9". At the instant the 200th FSS level reversal is received by the CPU 57, two of the LEDs in group 1, LED5 and LED6, are activated while the remainder of the LEDs remains deactivated. After the 100 μs delay, LED5 and LED6 are deactivated. Next, LED4, which comprises group 2, is activated. After 100 μs, LED 4 is deactivated, and LED2 and LED3 of group 3 are activated. LED1 remains deactivated. LED2 and LED3 are deactivated after another 100 μs delay. Thus, the first column of the character in FIG. 3 is formed. FIG. 7 shows the timing sequence for the remaining columns that would apply in imprinting the character of FIG. 3.

The time delays between imprinting of the successive groups of data, group 1, group 2 and group 3 are evident from the time chart of FIG. 7. The temporally staggered relationship between the imprinting of the three groups corresponds to the spatial staggering of the characters on film 31, shown in FIG. 3, as discussed above.

Thus, before each group of LEDs group 1, group 2 and group 3, is activated, the other groups are deactivated. Therefore, the maximum number of LEDs that may be activated simultaneously is three. If the current required to turn on each LED is 20 mA, a constant-voltage circuit with a capacity of 60 mA is enough to power LED array 59 of the invention.

After the imprinting of the first column of data, operation returns to the loop of Steps S200 and S201. In step S200, the status of the FSS is determined. If the FSS level has reversed, operation proceeds to step S202. If the FSS level has not reversed, operation proceeds to step S201. Step S201 branches back to node 2 in FIG. 5, if the film end detection timer has lapsed, or returns to step S200 if it has not.

Referring now to FIGS. 3, and 6, when the FSS level reversal takes place, corresponding to a FSS count of 201, operation proceeds again through steps S202 to S208. Another staggered column of the desired character, ie., column B of FIG. 3, is thus imprinted. Similarly, columns C, D and E are imprinted at the 202nd, 203rd and 204th FSS level reversal respectively, completing the imprinting of the first character.

These steps are repeated as above for each character until all the desired characters have been imprinted. In the present embodiment, the operation is repeated until the 280th FSS level reversal is counted.

Referring to FIGS. 5 and 6, after the 280th FSS edge is counted, and data imprinting is completed, the procedure returns from step S204 to step S104 and the S104/S105 loop of FIG. 5.

Returning to FIG. 2, two of the 5 control signal output terminals, in data imprinting device 10, C2 and C4, of CPU 57 are each connected to pairs of control signal input terminals E2/E3 and E5/E6 respectively. Control signal output terminal C2 is connected to control signal input terminals E2 and E3 and control signal output terminal C4, to control signal input terminals E2 and E3. Thus, data imprinting device 10 permits the number of control signal output terminals C1~C5 and control signal lines D1~D5 to be significantly reduced compared with a conventional device.

To be more precise, in the present embodiment, control signals from control signal output terminals C2 and C4 are passed through signal lines D2 and D4, respectively. Signal lines D2 and D4 each input control signals to control signal input terminal pairs E2/E3 and E5/E6, respectively. Accordingly, control signal output terminals C2 and C4 control LED pairs LED2/LED3 and LED5/LED6, respectively. Therefore, LED2 is always activated with LED3 and LED5 is always activated with LED6.

By connecting certain input and output terminals as described, the invention reduces to five the number of signal lines D1~D5 compared to the seven signal lines required in the conventional device.

Another result of the present invention, is that finding sufficient space to attach signal lines is made easier.

Also, reducing the number of control signal output terminals C1~C5 of CPU 57 from seven to five, allows the size of CPU 57 to be reduced. This makes it possible to reduce the size and the cost of the entire camera.

The pairing of LEDs as discussed allows imprinting of dot matrix characters is show in FIG. 3. Since characters formed in this way are sufficiently recognizable, the device described is as suitable for imprinting data as are conventional devices.

Although the described embodiment called for the pairing of control of LED2 with LED3 and LED5 with LED6, it is recognized by those skilled in the art that other pairings are possible. Such other combinations may be employed without departing from the scope or spirit of the invention as defined in the claims.

Although seven LEDs are used in the embodiment described above, the number of LEDs is not limited to seven. Any convenient number of LEDs may be used for representing characters without departing from the scope or spirit of the invention as defined in the claims.

Furthermore, in the described embodiment, data is imprinted in the form of numerals. However, it is recognized by those skilled in the art that the invention may be applied to the imprinting of other types of characters. For example, the invention may be applied to the imprinting of alphabet, the Japanese syllabary, such as hiragana and katakana, and Chinese characters, without departing from the scope or spirit of the invention as defined in the appended claims.

Moreover, in the described embodiment, signal lines D2 and D4 were connected to pairs of control signal input terminals E2/E3 and E5/E6. However, it is recognized by those skilled in the art that a single signal line may be connected to three or more control signal input terminals without departing from the scope or spirit of the invention as defined in the claims.

Furthermore, the possible grouping combinations of LEDs is not limited to those described above. Other combinations may be employed if each group comprises LEDs that are adjacent to each other. However, the number of LEDs in a group should be set considering the slanting effect incurred. Very few LEDs per group would cause the characters imprinted to be too slanted, as in the prior-art reference noted in the background section hereof. Many LEDs per group would diminish the advantage obtained in reduction of peak demand on the constant voltage circuit. Light emitting elements other than LEDs may be employed without departing from the spirit and scope of the invention.

The invention described may reduce considerably, the number of control signal terminals and lines, and power demand of a camera data imprinting device. Thus, the size and cost of the CPU, the number of signal lines, and the size, complexity and cost of the constant voltage circuit elements are reduced compared to conventional devices.

Additionally, the present invention imprints characters that are less slanted than those imprinted by prior art devices that employ temporal staggering of the LEDs. For example, Japanese Laid-open Patent Publication No. 4-81831, obtains a lower peak power requirement by activating the LEDs sequentially, and activating successive LEDs before the previous ones are deactivated. However, in this device, the characters imprinted are very slanted and difficult to read.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A data imprinting device for a camera comprising:

a plurality of light emitting elements including at least first and second groups, at least one of said at least first and second groups having at least two light emitting elements therein;

a control circuit;

said control circuit including a first sub-circuit which produces at least a first control signal and a second control signal;

a first device, responsive to said first control signal, which controls said first group of said plurality of light emitting elements;

a second device, responsive to said second control signal, which controls said second group of said plurality of light emitting elements, independently of said first group of said plurality of light emitting elements; and said control circuit including a second sub-circuit which controls said first control signal at a time non-overlapping with a timing of controlling of said second control signal, whereby reduced peak power demands are provided.

* * * * *